No. 705,598. Patented July 29, 1902.
J. A. McCAIN.
COTTON PLANTER.
(Application filed Nov. 16, 1901.)
(No Model.)
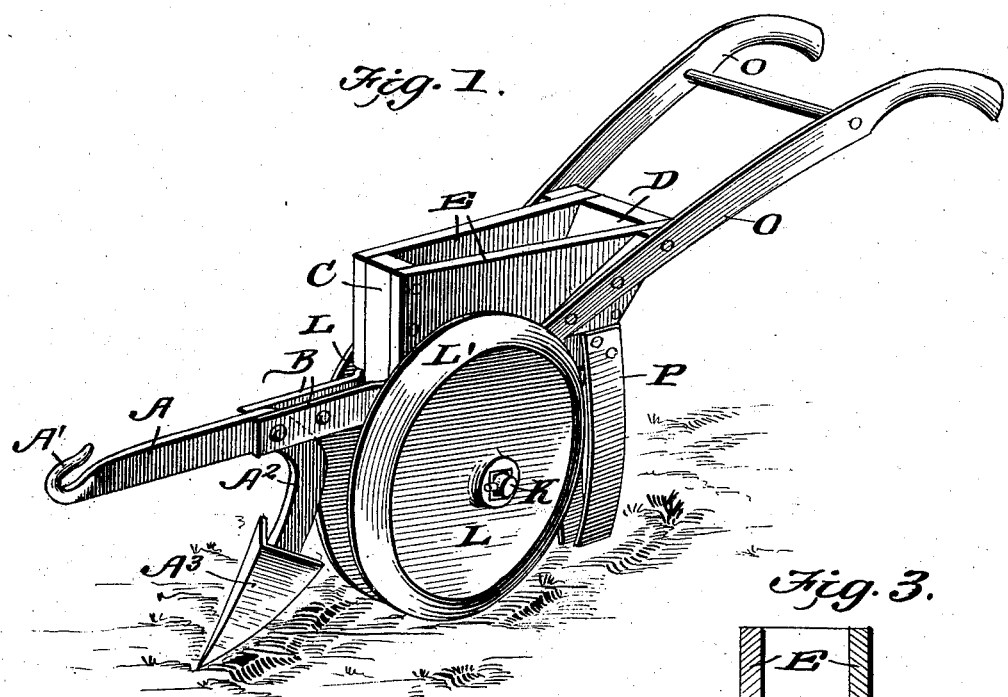
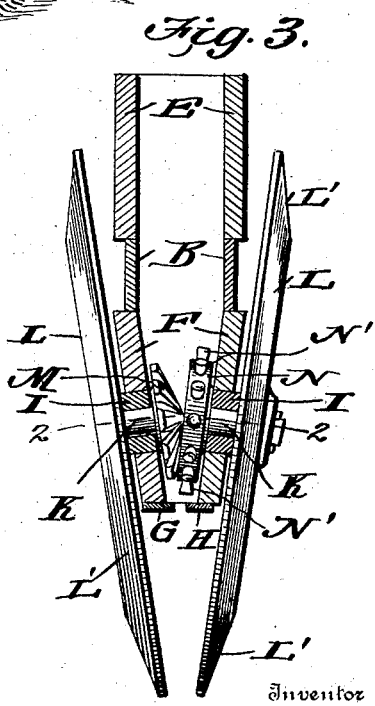
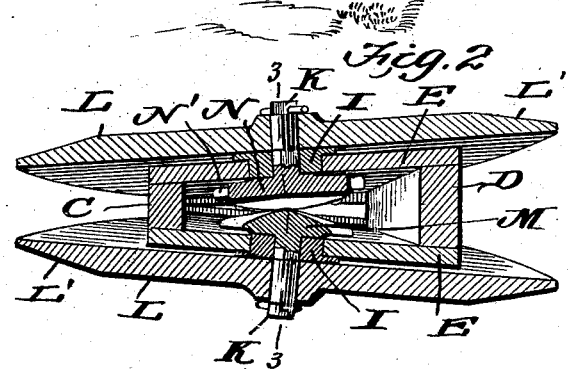
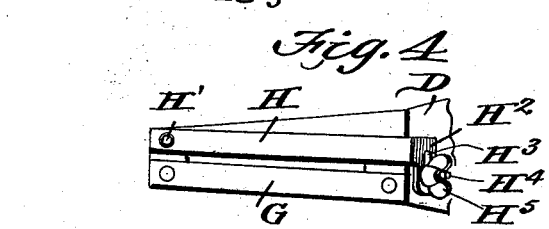
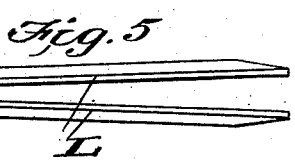
Witnesses
M. D. Blondel
Clarence Shaw
Inventor
John A. McCain,
By Munn & Co
Attorneys
THE NORRIS PETERS CO., PHOTO-LITHO., WASHINGTON, D. C.

UNITED STATES PATENT OFFICE.

JOHN ALEXANDER McCAIN, OF ATLANTA, GEORGIA.

COTTON-PLANTER.

SPECIFICATION forming part of Letters Patent No. 705,598, dated July 29, 1902.

Application filed November 16, 1901. Serial No. 82,557. (No model.)

*To all whom it may concern:*

Be it known that I, JOHN ALEXANDER MC-CAIN, a citizen of the United States, residing at Atlanta, in the county of Fulton and State of Georgia, have invented a new and useful Improvement in Cotton-Planters, of which the following is a specification.

This invention relates generally to planters, and more particularly to one intended for planting cotton-seed or seed of a similar nature.

The object of the invention is to provide a simple and efficient device which will uniformly feed the seed and avoid clogging; and with this object in view the invention consists in the novel features of construction and combination hereinafter fully described, and pointed out in the claims.

In the drawings forming part of this specification, Figure 1 is a perspective view of a planter constructed in accordance with my invention. Fig. 2 is a horizontal sectional view on the line 2 2 of Fig. 3. Fig. 3 is a section on the line 3 3 of Fig. 2. Fig. 4 is a detail bottom plan view illustrating the manner of adjusting the feed-slide, and Fig. 5 is a diagrammatic view illustrating the relative positions of the ground-wheels to each other.

In carrying out my invention I employ a beam A, having the hook A' at its forward end, the rear end terminating in a standard $A^2$, to which the shovel or point $A^3$ is attached. Hopper-supporting beams B are attached to the central draft-beam A, adjacent to its rear end, said beams gradually diverging, and between these beams are arranged the vertical end C and the inclined rear end D of the hopper, and connected to said ends C and D are the side pieces E, arranged above the beams, and converging side pieces F, arranged below the side beams. A stationary plate G is arranged upon the beam of one of the sides, and the movable slide or plate H is pivoted at H' upon the bottom of the other side F, said movable slide or plate H having an angular end $H^2$ slotted at $H^3$, so that the said slide or plate can be adjusted to increase or diminish the size of the opening at the bottom of the hopper, a pin $H^4$ passing through the slot $H^3$, said pin having a winged nut $H^5$ arranged thereon for the purpose of securing the plate or slide in its adjusted position. Journal-boxes I are arranged in the lower sides of the hopper, and turning in said boxes are the stub-axles K, the outer ends of which are square in cross-section and have the ground-wheels L mounted thereon. Upon the inner end of one stub-axle is a corrugated disk M, while upon the inner end of the other stub-axle is a disk N, having points or teeth N' projecting from the periphery thereof. Inasmuch as the sides of the hopper converge the ground-wheels will also converge, and the edges of these wheels are beveled upon the outer sides, as shown at L', in order that the said wheels may travel in the furrow opened by the point $A^3$. The converging wheels virtually provide a chute between which the seeds are dropped, and inasmuch as the said wheels are connected to the corrugated and toothed disks it will be readily seen that choking or clogging is almost impossible.

Handles O are attached to the rear end of the hopper, and covering-blades P extend from the rear ends of the hopper-supporting beams B for the purpose of covering the seed. By having the hopper broader at its rear end than at the forward end the ground-wheels are made to travel closer together at the front than at the rear, as most clearly shown in Fig. 5, and any earth which may be lifted by the said wheels will be dropped before the said wheels make a quarter-revolution, inasmuch as the faces of the said wheels diverge as they travel rearwardly.

It will thus be seen that I provide an exceedingly cheap, simple, and efficient construction of planter and one which will accomplish all of the objects for which it is intended.

Having thus fully described my invention, what I claim as new, and desire to secure by Letters Patent, is—

1. In a planter, the combination with the hopper having converging sides, axles journaled in the said sides and carrying ground-wheels at their outer ends, and the stirrer-wheels arranged upon the inner ends of said axles, substantially as described.

2. In a planter the combination with a hopper having converging sides, the rear end of said hopper being wider than the front end, stub-axles journaled in the converging sides, the ground-wheels rigidly mounted upon the outer ends of said axles, a corrugated disk mounted upon the inner end of one axle, and a tooth-disk arranged upon the inner end of the other axle, substantially as described.

3. In a planter, the combination with a hopper having converging sides, ground-wheels having their axles journaled in the said converging sides, a stationary plate arranged upon the bottom of one side piece of the hopper, and an adjustable plate arranged upon the bottom of the other side piece of the hopper, said hopper being broader at its rear end than at the forward end, substantially as described.

4. The combination with a main beam having a standard attached thereto, the hopper-supporting beams attached to the main beam, the front and rear ends of the hopper arranged between the said hopper-supporting beams, the rear end of the hopper being broader than the forward end, and also arranged at an angle, the upper side pieces of the hopper arranged substantially parallel to each other, the lower side pieces of the hopper converging at their lower end, stub-axles journaled in the said lower side pieces of the hopper, the ground-wheels mounted upon the outer end of said stub-axles, and the stirrer-wheels arranged upon the inner ends of said stub-axles, substantially as set forth.

JOHN ALEXANDER McCAIN.

Witnesses:
JOSEPH L. COBB,
J. W. ADAMS.